United States Patent Office 3,535,310
Patented Oct. 20, 1970

3,535,310
6,9 - DIALKYL - 6,7,8,9 - TETRAHYDRO - 2 - PHEN-
YL - 5H - PYRIMIDO[4,5-e][1,4]DIAZEPIN-5-ONES
AND THE PROCESS FOR THEIR PREPARATION
Dong H. Kim, Wayne, and Arthur A. Santilli, Haver-
town, Pa., assignors to American Home Products Cor-
poration, New York, N.Y., a corporation of Delaware
No Drawing. Filed Feb. 12, 1968, Ser. No. 704,576
Int. Cl. C07d 53/02
U.S. Cl. 260—239.3    10 Claims

ABSTRACT OF THE DISCLOSURE

The present invention is concerned with 6,9-dialkyl-
6,7,8,9 - tetrahydro - 2 - phenyl - 5H-pyrimido[4,5-e]
[1,4]diazepin-5-ones which are pharmacologically active
as anticonvulsant agents. Further, it relates to the prep-
aration of these compounds by the interaction of an 5-
carbalkoxy-4-chloro - 2 - phenylpyrimidine with an ap-
propriate N,N'-dialkylethylenediamine.

---

The present invention relates to bicyclic pyrimido-
diazepinones and the process for their preparation. More
particularly, it is concerned with 6,9-dialkyl-6,7,8,9-tetra-
hydro-2 - phenyl - 5H - pyrimido[4,5-e][1,4]diazepin-5-
ones which have demonstrated anticonvulsant properties
when tested under standard and accepted pharmacologi-
cal procedures.

The new and novel compounds within the purview of
the present invention are exemplified by those having the
following formula:

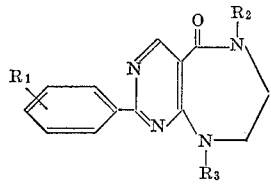

wherein $R_1$ is a substituent as exemplified by hydrogen,
halogen, lower alkyl and lower alkoxy; $R_2$ and $R_3$ are the
same and are both lower alkyl. As employed herein the
term "lower alkyl" and "lower alkoxy" are meant to in-
clude both branched and straight chain moieties having
from one to about eight carbon atoms. Typical examples
of these compounds are: 6,7,8,9-tetrahydro-6,9-dimethyl-
2-phenyl - 5H - pyrimido[4,5-e][1,4]diazepin-5-one; 6,9-
diethyl - 6,7,8,9 - tetrahydro - 2 - phenyl - 5H-pyrimido
[4,5-e][1,4]diazepin - 5 - one; and 2-p-chlorophenyl)-
6,7,8,9 - tetrahydro - 6,9 - dimethyl-5H-pyrimido[4,5-e]
[1,4]diazepin-5-one.

The pyrimidodiazepinones of the present invention are
prepared by the new and novel process which is herein-
after illustrated by the following reaction scheme:

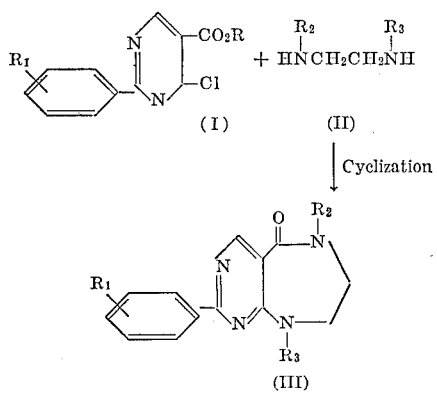

wherein $R_1$, $R_2$ and $R_3$ are defined as above, and $R$ is
lower alkyl. This reaction is effected by slowly contact-
ing, e.g. about five to about thirty minutes, a 5-carbalk-
oxy-4-chloro-2 - phenylpyrimidine (I) with about five
molar equivalents of an appropriate N,N'-dialkylethyl-
enediamine, in the presence of a weak base, in a lower
liquid alkanol for a period of about fifteen minutes to
about one hour at about reflux temperatures. Preferably
this reaction is conducted in the presence of sodium car-
bonate in ethanol.

When the cyclization reaction is complete, the result-
ing pyrimidodiazepinones (III) are separated by stand-
ard recovery procedures, for example, the reaction mix-
ture is filtered, the filtrate chilled and the resulting pre-
cipitated product is then collected, washed and recrystal-
lized from a suitable solvent, such as, cyclohexane. As
employed herein, the term "weak base" is exemplified by
sodium carbonate, potassium carbonate, sodium bicarbo-
nate, and potassium bicarbonate while other such com-
pounds will readily suggest themselves to one skilled in
the art. The starting materials employed in the process
of this invention are commercially available or are easily
prepared by procedures well known in the chemical art.

The new and novel pyrimidodiazepinones (III) of the
present invention possess valuable pharmacological ac-
tivity. In particular, these compounds in standard phar-
macological procedures demonstrate anticonvulsant activ-
ity and are useful an anticonvulsant agents. Because of
this property they are of importance in experimental and
comparative pharmacology.

In the pharmacological evaluation of the anticonvul-
sant agents of this invention the in vivo effects of the
compounds of this invention are tested by the two here-
inafter listed procedures.

(I) The method described by Swinyard, E. A., Brown,
W. C., and Goodman, L. C., in P. Pharmacol., 106; 319,
1952, which is generally described as follows:

The test compounds are administered orally at graded
dose levels to groups of six mice. One hour later, the
animals are given a supromaximal electroshock through
corneal electrodes (25 ma., 0.2 sec.). Presence or absence
of tonic extensor seizures as well as the number of deaths
are recorded.

The compounds of this invention in the above test
demonstrated an $ED_{50}$ of 200 to 400 mg./kilogram of
body weight for the prevention of convulsions inducted
by supramaximal electroshock.

(II) The test of compounds are administered orally
at a number of dose levels to a group of six mice (3
males and 3 females). One hour later the animals are
challenged by the intraperitoneal administration of 125
mg./kilo of pentylenetetrazol. The incidence of clonic
and tonic convulsions and deaths, is observed for one-
half hour.

The compounds of this invention in the above test
demonstrate an $ED_{50}$ of 50 to 200 mg./kilogram of body
weight for the prevention of convulsions and deaths in-
duced by pentylenetetrazol.

When the pyrimidodiazepinone compounds of this in-
vention are employed as anticonvulsant agents in warm-
blooded animals, e.g. mice, they may be administered
alone or in combination with pharmacologically ac-
ceptable carriers, the proportion of which is determined by
the solubility and chemical nature of the compound,
chosen route of administration and standard biological
practice. For example, they may be administered orally
in a solid form containing such excipients as starch, milk
sugar, certain types of clay and so forth. They may also
be administered orally in the form of solutions or they
may be injected parenterally. For parenteral administra-
tion they may be used in the form of a sterile solution containing other solutes, for example, enough saline or glucose to make the solution isotonic.

The dosage of the present anticonvulsant agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

Three grams of 4-chloro-5-carbethoxy-2-phenylpyrimidine are added to a mixture of 7.0 g. of N,N'-dimethylethylenediamine and 0.6 g. of sodium carbonate (powder) in 25 ml. of absolute ethanol in small portions over a period of ten minutes with vigorous stirring. The stirring is continued for twenty-five minutes, then heated to reflux for fifteen minutes. After separating insoluble materials from the reaction mixture by filtration, the filtrate is chilled. Crystals thus separated are collected on a filter and washed with absolute ethanol to give 3.0 g. of product, M.P. 152–156° C. Recrystallizations from cyclohexane affords 6,7,8,9-tetrahydro-6,9-dimethyl-2-phenyl-5H-pyrimido[4,5-e][1,4]diazepin - 5 - one, M.P. 155–157° C.

Analysis.—Calcd. for $C_{15}H_{16}N_4O$ (percent): C, 67.14; H, 6.01; N, 20.88. Found (percent): C, 67.07; H, 6.34; N, 21.00.

Similarly, 4-bromo-5-carbomethoxy-2-(p-chlorophenyl) pyrimidine is reacted with N,N'-dimethylethylenediamine to afford 2-(p-chlorophenyl)-6,7,8,9-tetrahydro-6,9-dimethyl-5H-pyrimido[4,5-e][1,4]diazepin-5-one.

EXAMPLE II

Six grams of 4-chloro-5-carbethoxy-2-(p-tolyl)pyrimidine is slowly added to a mixture of 14.0 g. of N,N'-dimethylethylenediamine and 1.2 g. of potassium carbonate in 50 ml. of absolute methanol in small portions with vigorous stirring. The stirring is continued for fifteen minutes, then heated to reflux for one hour. After separating insoluble materials from the reaction mixture by filtration, the filtrate is chilled. The resulting precipitate is collected on a filter, washed with absolute ethanol and recrystallized from cyclohexene to yield 6,7,8,9-tetrahydro-6,9-dimethyl-2-(p-tolyl)-5H-pyrimido[4,5-e][1,4]diazepin-5-one.

EXAMPLE III 6,9-diethyl-6,7,8,9-tetrahydro-2-phenyl - 5H - pyrimido [4,5-e][1,4]diazepin-5-one is prepared as in Example I from 3.0 g. of 4-chloro-5-carbethoxy-2-phenylpyrimidine, 8 g. of N,N'-diethylethylenediamine, 0.6 g. of sodium carbonate and 25 ml. of absolute ethanol. After filtering out the insoluble material from the hot, reaction mixture the filtrate is concentrated to an oil under reduced pressure. Addition of water to the residue causes separation of solid which is collected on a filter and washed with water and ether. Recrystallization of the crude product from cyclohexane affords 1.0 g. of product, M.P. 116–118° C.

Analysis.—Calcd. for $C_{17}H_{20}N_4O$ (percent): C, 68.89; H, 6.80; N, 18.91. Found (percent): C, 68.92; H, 6.64; N, 18.90.

EXAMPLE IV

One and a half grams of 4-chloro-5-carbethoxy-2-phenylpyrimidine is slowly added to a mixture of 3.5 g. of N,N'-dipropylethylenediamine and 0.3 g. of potassium bicarbonate in 12.5 ml. of absolute ethanol in small portions with vigorous stirring. The stirring is continued for a short time, then heated to reflux for a half hour. After separating insoluble materials from the reaction mixture by filtration, the filtrate is chilled. The resulting precipitate is collected on a filter and washed with absolute methanol to give 6,7,8,9-tetrahydro-2-phenyl-6,9-dipropyl-5H-pyrimido[4,5-e][1,4]diazepin-5-one.

Similarly, 5-carbethoxy-4-chloro-2-phenylpyrimidine is reacted with N,N'-dibutylethylenediamine, in the presence of sodium carbonate, in propanol to afford 6,9-dibutyl-6,7,8,9 - tetrahydro - 2 - phenyl-5H-pyrimido[4,5-e][1,4]diazepin-5-one.

EXAMPLE V

Repeating the procedures as described in Examples I–IV to react a 5-carbalkoxy-4-chloro-2-phenylpyrimidine with an appropriate N,N'-dialkylethylenediamine, in the presence of an alkali metal carbonate or bicarbonate, in an alkanol, the following compounds are prepared:

2-(p-bromophenyl)-6,7,8,9-tetrahydro-6,9-dimethyl-5H-pyrimido[4,5-e][1,4]diazepin-5-one;
6,9-diethyl-2-(m-ethylphenyl)-6,7,8,9-tetrahydro-5H-pyrimido[4,5-e][1,4]diazepin-5-one;
6,7,8,9-tetrahydro-2-(p-methoxyphenyl)-6,9-dimethyl-5H-pyrimido[4,5-e][1,4]diazepin-5-one;
6,7,8,9-tetrahydro-2-(p-iodophenyl)-6,9,-dimethyl-5H-pyrimido[4,5-e][1,4]diazepin-5-one;
2-(p-butoxphenyl)-6,9-diethyl-6,7,8,9-tetrahydro-5H-pyrimido[4,5-e][1,4]diazepin-5-one;
6,7,8,9-tetrahydro-6,9-dipropyl-2-(m-propylphenyl)-5H-pyrimido[4,5-e][1,4]diazepin-5-one;
6,9-diethyl-2-(p-fluorophenyl)-6,7,8,9-tetrahydro-5H-pyrimido[4,5-e][1,4]diazepin-5-one; and
2-(p-ethoxyphenyl)-6,7,8,9-tetrahydro-6,9-dimethyl-5H-pyrimido[4,5-e][1,4]diazepin-5-one.

What is claimed is:
1. A compound selected from the group consisting of those having the formula:

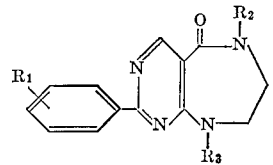

wherein $R_1$ is selected from the group consisting of hydrogen, halogen, lower alkyl and lower alkoxy; $R_2$ and $R_3$ are the same and are both lower alkyl.

2. A compound as described in claim 1 which is: 6,7,8,9 - tetrahydro - 6,9 - dimethyl - 2 - phenyl - 5H-pyrimido[4,5-e][1,4]diazepin-5-one.

3. A compound as described in claim 1 which is: 6,9-diethyl - 6,7,8,9 - tetrahydro - 2 - phenyl - 5H - pyrimido-[4,5-e][1,4]diazepin-5-one.

4. A compound as described in claim 1 which is: 2-(p-chlorophenyl) - 6,7,8,9 - tetrahydro - 6,9 - dimethyl - 5H-pyrimido[4,5-e][1,4]diazepin-5-one.

5. A compound as described in claim 1 which is: 6,7,8,9 - tetrahydro - 6,9 - dimethyl - 2 - (p - tolyl) - 5H-pyrimido[4,5-e][1,4]diazepin-5-one.

6. A compound as described in claim 1 which is: 6,7,8,9 - tetrahydro - 2 - phenyl - 6,9 - dipropyl - 5H-pyrimido[4,5-e][1,4]diazepin-5-one.

7. A compound as described in claim 1 which is: 2-(p-bromophenyl) - 6,7,8,9 - tetrahydro - 6,9 - dimethyl - 5H-pyrimido[4,5-e][1,4]diazepin-5-one.

8. A compound as described in claim 1 which is: 6,7,8,9 - tetrahydro - 2 - (p - methoxyphenyl) - 6,9 - dimethyl-5H-pyrimido[4,5-e][1,4]diazepin-5-one.

9. A process for the preparation of compounds having the formula:

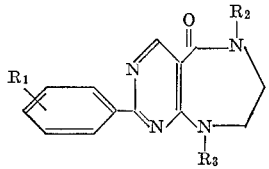

wherein $R_1$ is selected from the group consisting of hydrogen, halogen, lower alkyl and lower alkoxy; $R_2$ and $R_3$ are the same and are both lower alkyl, which comprises slowly contacting a compound of the formula:

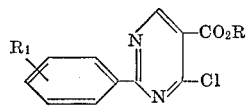

wherein $R_1$ is defined as above, and R is lower alkyl with about five molar equivalents of a diamine of the formula:

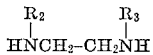

wherein $R_2$ and $R_3$ are defined as above, in the presence of a weak base, in a lower liquid alkanol for a period of about fifteen minutes to about one hour at about reflux temperatures.

10. A process as described in claim 9 wherein the weak base is sodium carbonate and the lower alkanol is ethanol.

References Cited

FOREIGN PATENTS 1,497,891  9/1967  France.
1,080,530  8/1967  Great Britain.

HENRY R. JILES, Primary Examiner

R. T. BOND, Assistant Examiner

U.S. Cl. X.R.

424—251